Figure 1:
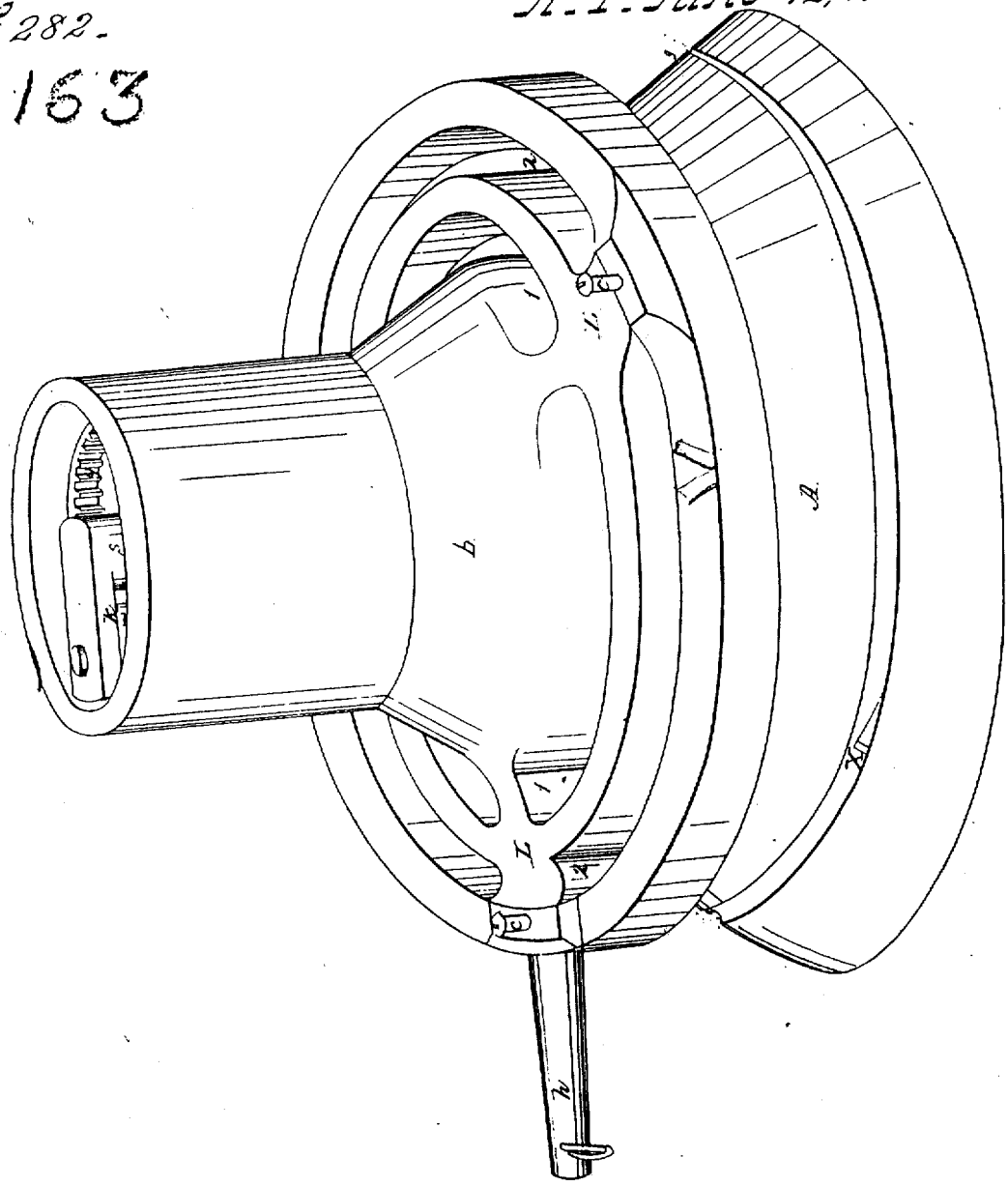
Figure 2:
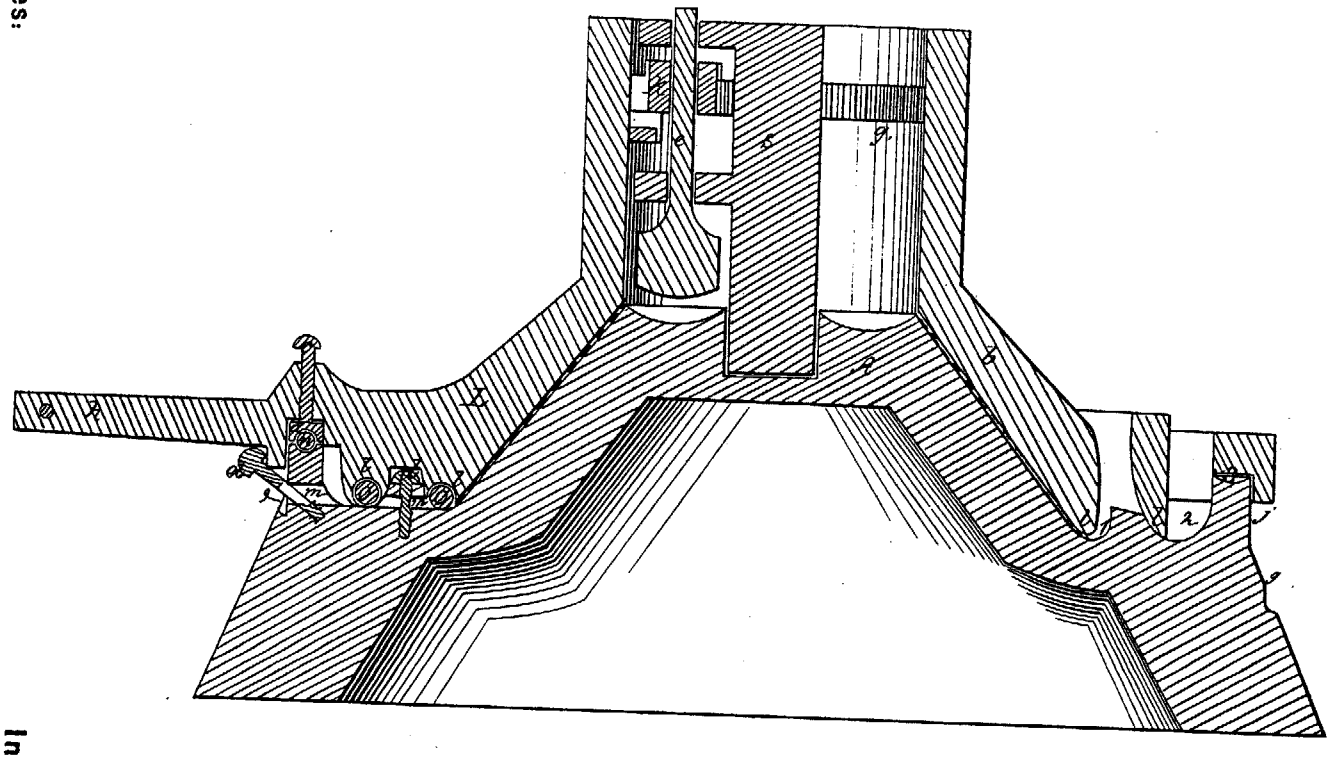

FIP3212 OR AI 282

BEST AVAILABLE COPY

Sheet 1-2 Sheets.

J. C. Dickey,

Ore Mill,

A. I. June 12, 1860.

N. I. No. 282.

28.163

Witnesses;

G. H. Phillips

G. A. B. Smith

Inventor:

Julius C. Dickey.

J. C. DICKEY.

2 Sheets—Sheet 2.

Ore Mill.

No. 282.

A. I. Patented June 12, 1860

Witnesses:

J. H. Phillips

G. A. C. Smith

Inventor:

Julius C. Dickey.

AM. PHOTO-LITHO. CO. N.Y. (OSBORNE'S PROCESS.)

UNITED STATES PATENT OFFICE.

RENSSELAER D. GRANGER, OF TROY, NEW YORK.

IMPROVEMENT IN ROTARY STOVES BY ADDING AN OVEN THERETO.

Specification forming part of Letters Patent No. 282, dated July 17, 1837.

*To all whom it may concern:*

Be it known that I, RENSSELAER D. GRANGER, of the city of Troy, in the county of Rensselaer and State of New York, have invented an improvement in what are usually denominated "rotary stoves," by the addition of an oven thereto, which does not interfere with the other ovens or means of cooking, or require any additional fuel for heating it, and which oven may be added to stoves of other descriptions; and I do hereby declare that the following is a full and exact description thereof.

The drawing represents the ordinary rotary stove with my improvement thereon.

The top or revolving plate, A, has a tube or collar passing through a hole in its center to receive the pipe B, which tube or collar is firmly attached to the lower plate, but is open on one or more sides within the chamber, between the two plates, to admit the heated air to pass into it and into the pipe B, which fits onto it. The top A revolves freely round the tube or collar. A second pipe, C, rises from the diving-flue at the back of the stove in the ordinary way, and both these pipes enter the bottom plate of an oven, D, which I usually make of sheet-iron. This oven is composed of double plates at its top, bottom, and ends, forming flues which surround it, excepting at the sides, where the doors are situated. When this oven is to be used for baking, a valve, E, in the pipe B is left open. The principal part of the heated air from the fire will then pass up this pipe and through the flues above and below the oven, escaping eventually through a pipe from F into a chimney. Sometimes I put a valve into the pipe C and dampers or valves into the flues above and below the oven; but in general I omit these, having found the valve in the pipe B sufficient, and therefore to be preferred on account of its simplicity. The oven D is elevated by means of the pipes B and C to such a height as to allow the boilers to pass under it, and as the tube or collar leading to the pipe B might otherwise interfere with the use of a boiler of large size without increasing the diameter of the top, I make a swell, G, in the periphery of the rotary top to admit such a boiler.

Having thus fully described my said improvement and shown what I believe to be the most convenient mode of carrying the same into operation, I wish it to be understood that I do not intend to confine myself to the precise manner of constructing the same herein presented. There may, for example, be two diving-flues, each furnished with a pipe like that marked C, and leading into the flue of an oven constructed like D, by which a like end would be attained, but in a manner less convenient than that above described.

What I claim as my improvement is—

1. The conveying the heated air from the fuel through two or more pipes into an oven elevated above the main body of a rotary stove, allowing the boilers to pass under it, and operating substantially upon the principle herein set forth.

2. The formation of the swell or curve extending beyond the periphery of the rotary top, for the purpose of giving room to a large boiler, either when a center tube or collar is employed or when it is desired to obtain room in the ordinary rotary stove in which my oven is not used.

RENSSELAER D. GRANGER.

Witnesses:

THOS. P. JONES,

LEVI RICE.